E. BUGATTI.
SHOCK ABSORBER.
APPLICATION FILED MAY 22, 1914.

1,178,621.  Patented Apr. 11, 1916.

Witnesses:  Inventor:
Ettore Bugatti
by his attorney

UNITED STATES PATENT OFFICE.

ETTORE BUGATTI, OF MOLSHEIM, GERMANY.

SHOCK-ABSORBER.

1,178,621.  Specification of Letters Patent.  Patented Apr. 11, 1916.

Application filed May 22, 1914. Serial No. 840,180.

*To all whom it may concern:*

Be it known that I, ETTORE BUGATTI, a subject of the King of Italy, and residing at Molsheim, Alsace, German Empire, have invented certain new and useful Improvements in Shock-Absorbers, of which the following is a specification.

The present invention relates to improvements in shock absorbers for automobiles and other vehicles.

According to this invention the oscillations are damped by means of a single movable arm or lever, which is connected with the axle or the axle tube, and on up and down motion of the same comes into operation, the degree of frictional resistance offered altering with the extent of the vibrations.

Figure 1:
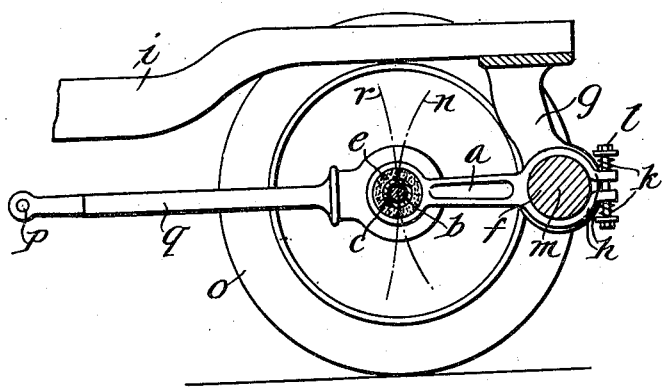
Figure 2:
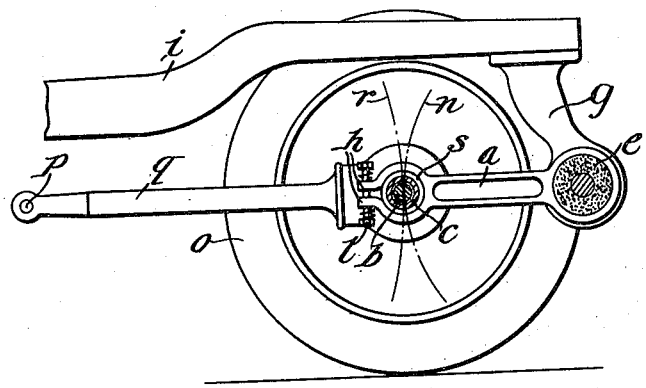

In the accompanying drawings, Figures 1 and 2 show two different constructional forms of the improved shock absorber.

According to the present invention the one end of the movable shock absorber arm or lever $a$ (Fig. 1) is connected directly with the axle $b$ or the axle tube $c$, a rubber bushing $e$ being interposed between the two. The other end $h$ of the lever $a$ is split and is mounted with capability of turning with friction on the periphery of a disk like part $f$ projecting from a bracket $g$, which is rigidly connected with the vehicle frame $i$. The force with which the split end $h$ of the lever $a$ is pressed to the part $f$ is regulable by means of springs $k$, controlled by nuts $l$ or the like, whereby the amount of frictional resistance between the sliding parts is adjustable. Since the end $h$ of the lever $a$ turns about the point $m$, the path of motion of the center of the eye of the other lever end, which embraces the axle $b$ or the axle tube $c$, is that designated by the letter $n$. The axle $b$ of the wheels $o$, on the other hand, which is incased in the tube $c$, moves about the axis of oscillation $p$ of the lateral stay rods and supporting tube of the Cardan shaft $q$, or of the chain tightener, in the path designated by the letter $r$. Since the axes of oscillation $m$ and $p$ of the lever $a$ and supporting tube $q$, or chain tightener, are stationary relatively to the frame $i$, it will be seen that on shocks, i. e. up and down motion of the wheels $o$, occurring, such as is continually happening when the vehicle is running, the shock absorber will act in the following manner: As the lever $a$ with the rubber bushing $e$ engages the axle tube $c$, it is compelled to share the up and down motion of the same. Since, however, the centers of oscillation $m$ and $p$ occupy different positions, the lever $a$ will follow the path $n$, instead of the path $r$ of the axle $b$. The result of this is, that, depending upon the extent of the shock, that is, of the vibrations, a varying pull will be exerted upon the lever $a$, the rubber bushing $e$ at the same time yielding. Hence the lever $a$ in turning will, owing to the pull, be pressed upon the disk or part $f$ more or less. The frictional resistance will obviously be altered correspondingly, as it likewise increases with increased oscillation of the lever $a$, so that the bumping action of the car springs on the body will be reduced.

As shown in Fig. 2, the arrangement of the lever $a$ drawn in Fig. 1 may be reversed, that is to say the split end $h$ of the lever may embrace the axle tube $c$ or a friction ring $s$ thereon, while the rubber bushing $e$ for the other end may be applied to a pin projecting from the rigid bracket $g$ pendent from the frame $i$.

It is manifest that other constructions may be devised according to the principle herein set forth, and within the range of the present invention.

Having thus described my invention, I claim as new—

1. In a vehicle, in combination, an axle, means holding the said axle to move up and down in an arc, a stationary bearing on the frame, an arm connecting the said axle and the said bearing, a frictional resistance, and a resilient bushing, said frictional resistance and said resilient bushing being interposed between the one or the other end of said arm respectively and the part connected thereto.

2. In a vehicle, in combination, an axle, means for holding the said axle to move up and down in an arc, a stationary bearing on the frame, a shock absorber having a single arm connecting the said axle and the said bearing, its one end being rotatable with friction on the part on which it is mounted, and a resilient bushing interposed between the opposite end of the arm and the surface on which it bears.

In testimony whereof I affix my signature in presence of two witnesses.

ETTORE BUGATTI.

Witnesses:
　JOSEPH ROHMER,
　CHARLES A. HALLEY, Jr.

Copies of this patent may be obtained for five cents each, by addressing the "Commissioner of Patents, Washington, D. C."